Feb. 18, 1964
W. KOBER
3,121,814
DYNAMOELECTRIC MACHINE
Filed Sept. 9, 1959
2 Sheets-Sheet 1
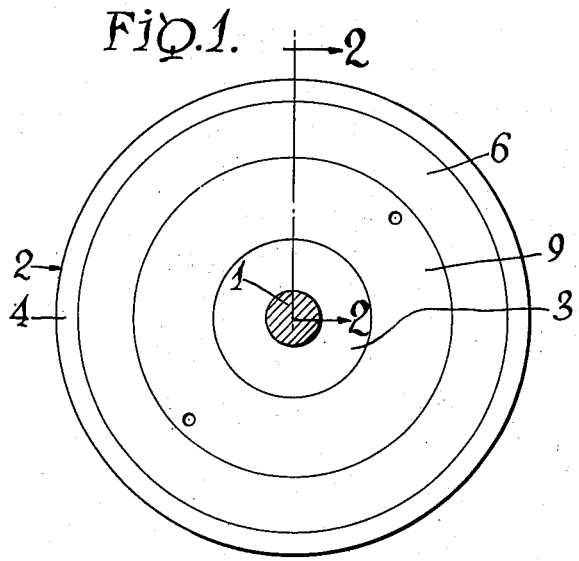
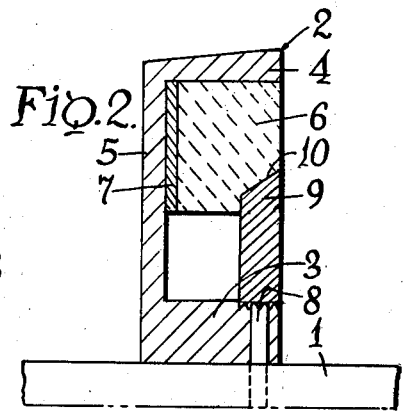
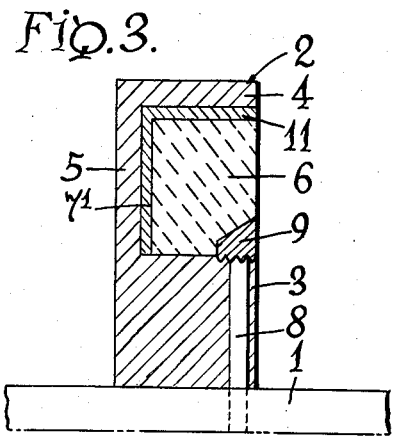
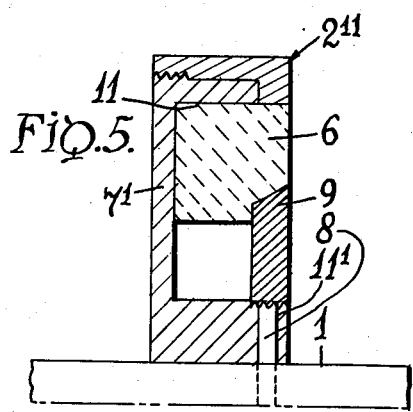
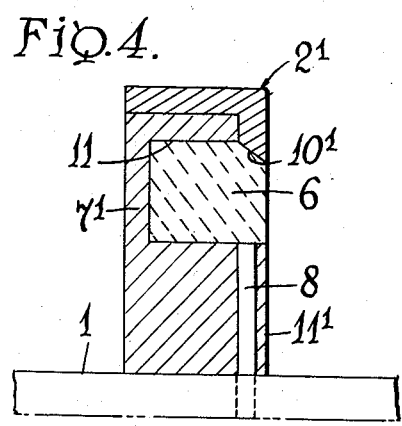
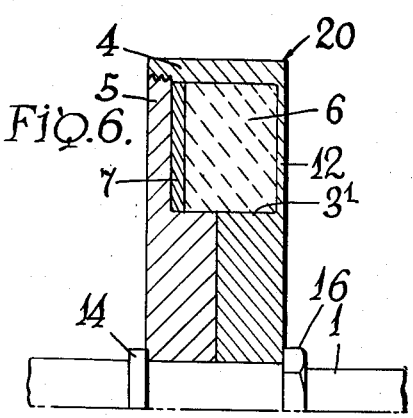
INVENTOR
William Kober,
BY Bean, Brooks, Buckley & Bean
ATTORNEYS.

INVENTOR
William Kober,

United States Patent Office 3,121,814
Patented Feb. 18, 1964

3,121,814
DYNAMOELECTRIC MACHINE
William Kober, Fairport, N.Y., assignor to
L. R. Power Corp., Rochester, N.Y.
Filed Sept. 9, 1959, Ser. No. 838,949
6 Claims. (Cl. 310—156)

This invention relates generally to the dynamoelectric art, and more particularly to dynamoelectric machines of the axial air gap type utilizing, in the field producing portion thereof, a permanent magnet of ceramic material.

In recent years ceramic magnet materials have been developed which make possible the use of ceramic permanent magnets. Such ceramic magnets offer many advantages. For example, they have greater resistance to demagnetization than Alnico and like materials, and a higher m.m.f. per unit length, and they are more adaptable and lighter in weight.

However, such ceramic magnets also present problems with respect to the proper support and protection thereof, from both a physical and a magnetic viewpoint, in an axial air gap construction. In addition, they have the disadvantage, compared to Alnico, of a relatively high temperature coefficient.

A primary object of my invention is to provide a retaining and supporting structure, for a ceramic magnet of annular form, working across an axial air gap, which structure is characterized by a high degree of physical strength, while being mechanically relatively simple.

Another object of my invention is to provide the foregoing in a structure which provides an electrically conductive path encircling the magnet and protecting the magnetic state thereof from overload and short circuit armature reaction.

Still another object of my invention is to provide a retaining and supporting structure having means compensating for the relatively high temperature coefficient of the ceramic magnet.

In one aspect thereof, an axial air gap field producing structure of my invention is characterized by the provision of an annular body of ceramic magnet material, an annular casing of unitary construction receiving the magnet and having generally concentric side walls receiving the magnet body and peripherally encircling the magnet body to support the same, and means retaining the magnet body in the casing.

The foregoing and other objects, advantages and characterizing features of an axial air gap ceramic magnet field producing structure of my invention will become clearly apparent from the ensuing detailed description of certain presently contemplated embodiments thereof, wherein like reference numerals denote like parts throughout the various views and wherein:

FIG. 1 is an elevational view of the air gap end face of a field producing structure of my invention;

FIG. 2 is an enlarged longitudinal, quarter sectional view thereof taken about on line 2—2 of FIG. 1;

FIGS. 3, 4, 5 and 6 are similar longitudinal, quarter sectional views of modifications of my invention;

Figure 7:
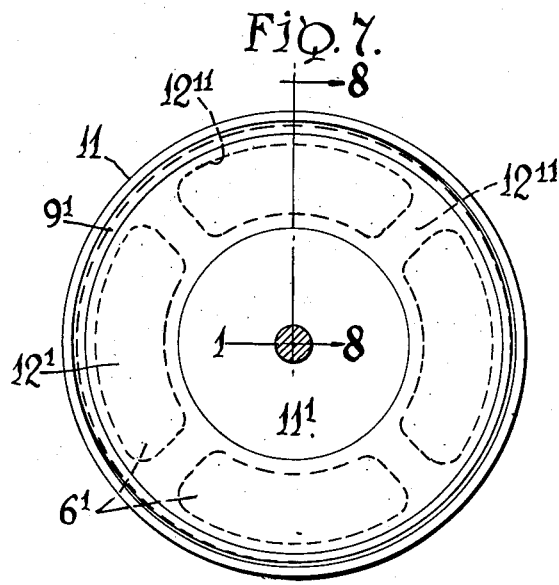
FIG. 7 is an end elevational view of another modification of my invention.

The permanent magnets with which this invention is concerned are made of a ceramic material, such as those utilizing barium ferrite ($BaFe_{12}O_{19}$) and which are commercially available under various names, such as for example "Indox" ceramic permanent magnets sold by The Indiana Steel Products Company of Valparaiso, Indiana, and described in its bulletin No. 18. While such magnets offer numerous advantages, making them highly desirable for many purposes, they are brittle and require a supporting structure of substantial physical strength, particularly in axial air gap arrangements where the magnet or magnets extend generally lengthwise of the axis of rotation and must be supported along the edge against centrifugal force.

This invention is particularly directed to structures for supporting a unitary, annular ceramic magnet, concentric with the axis of rotation, in an axial air gap machine. One form of the invention is illustrated in FIGS. 1 and 2, showing a shaft 1 suitably journalled for rotation about its axis and carrying an annular, cup like supporting casing, generally designated 2, for rotation about said axis. Casing 2 comprises inner and outer side walls 3 and 4, respectively, joined by an end wall 5, the walls 3, 4 and 5 being of unitary construction and receiving an annular permanent magnet 6 of ceramic material. An annular flux return plate 7, of iron or other suitable magnetic material, is interposed between wall 5 of casing 2 and the rear face of magnet 6.

Casing 2 is fixed to shaft 1, against movement lengthwise thereof and against rotation thereon, by a pin 8 extending through shaft 1 and the inner casing wall 3 on diametrically opposed sides thereof. Pin 8 is covered in place by retainer ring 9 having a beveled outer surface 10 overlying a corresponding beveled surface on magnet 6 and having threaded engagement with the outer periphery of casing wall 3.

With this construction, casing 2 is readily fixed to shaft 1, and magnet 6 and return plate 7, comprising a unit subassembly, are readily inserted in the casing and held in place therein by the ring 9 which is subsequently affixed to the casing. It is a particular feature of this construction that the magnet 6 can be magnetized, as a unit with return plate 7, prior to assembly in casing 2. It is also a particular feature of this invention that the outer casing wall 4 has substantial strength, not only because of the physical strength of the material comprising casing 2 but in addition because it finds shear support through its unitary construction with back wall 5. Therefore, the ceramic magnet 6 is supported against centrifugal force produced upon rotation of the structure. For even greater strength, outer wall 4 can taper outwardly from end wall 5, as illustrated in FIG. 2, to provide an increasing section of material with increasing distance from the end wall. Casing 2 is formed of a strong, nonmagnetic material which is lightweight, so as to minimize inertia, suitable materials being aluminum and appropriate alloys thereof.

It will be observed that the casing inner wall 3 need not closely encircle the inner periphery of the magnet body, but can be spaced therefrom with resulting saving in weight.

FIG. 3 shows a modification in which the magnetic return plate 7' has an axial extension 11 concentric with the axis of shaft 1 and with the casing wall 4, which could be tapered as in FIG. 2, to assist the latter in supporting the magnet 6 against centrifugal force. While the extension 11 increases the weight of the structure, this disadvantage is offset by the resulting increase in strength.

In FIG. 4 the casing 2 is eliminated, and is replaced by the flux return plate 7' having an outer axial extension 11 and an inner axial extension 11', which latter receives a pin 8 through shaft 1. The magnet 6 is retained against axial movement in the static state, by an outer ring 2' of lightweight material, such as that comprising casing 2 in FIGS. 2 and 3, which has a beveled inner edge 10' overlying the magnet in a manner similar to retainer ring 9 in FIGS. 2 and 3.

The embodiment of FIG. 5 is similar to that of FIG. 4, except that the outer, lightweight casing 2" is threaded onto the extension 11, whereas in FIG. 4 it is shrink fitted in place. Also, in FIG. 5 the retainer 9 is utilized.

Of course, ring 2" of FIG. 5 could be shrink fitted, and ring 2' of FIG. 4 could be threaded, if desired.

In the embodiment of FIG. 6, the ceramic magnet 6 is supported by a casing 20 having an outer wall 4 generally concentric with the axis of shaft 1, and a relatively thin front end wall 12 of for example 0.01–0.02 inch thickness extending across the working surface of magnet 6 and terminating in an inner wall 3' concentric with the outer wall 4 and with shaft 1. The outer wall 4 can be threaded on rear end wall 5, the shaft 1 having a shoulder 14 against which the rear wall 5 abuts, the assembly being locked in place by a nut 16 threaded on shaft 1. The threaded connection between walls 4 and 5 is helpful but not essential.

Here again, the outer wall 4 supports magnet 6 against centrifugal force, being reinforced by the front wall 12 and inner wall 3'. The front wall 12 also protects the working surface of magnet 6 against spalling, and provides an electrically conductive path which helps to protect the magnetic state of magnet 6 from overload and short circuit armature reaction. To this end, casing 20 is made of a highly electrically conductive material, such as duralumin, or other suitable aluminum alloy, as in the case of members 2, 2' and 2" in the embodiments previously described.

While ceramic magnet materials resist demagnetization to a far greater extent than metallic magnet materials such as Alnico, none the less there are many instances, particularly in larger machines, and where tooth tufting is not problem, where such protection is desirable. Indeed, the problem is somewhat aggravated, as compared to structures using Alnico, because of the absence of pole pieces.

Figure 8:
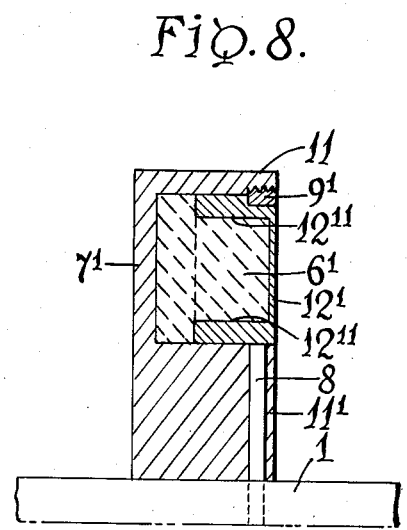
FIG. 8 is an enlarged longitudinal, quarter sectional view thereof, taken about on line 8—8 of FIG. 7.

FIGS. 7 and 8 illustrate another arrangement utilizing electrically conductive nonmagnetic materials to protect the magnetic state of the ceramic magnet body. In this arrangement, the flux return member 7' has inner and outer side wall extensions 11' and 11, as previously described with reference to FIGS. 4 and 5, the magnet body 6 being received therein. However, in this embodiment the magnet body 6 is axially recessed for a portion of its axial length, inwardly from the working, air gap face thereof, to define partially separated flux emitting portions or poles 6'. A protective member 12' of highly electrically conductive material is fitted over the air gap face of body 6, and is formed with axially extending flange portions 12" which encircle the poles 6'. In this way, each pole 6' is encircled by a highly electrically conductive path, in the portions 12", which protect the magnetic state of body 6. While the protective portions 12" could extend rearwardly to the flux return plate, protection at the air gap end of the poles 6' is the most effective, and generally will suffice to protect the magnetic state of magnet 6. The member 12' can be held against axial shifting by a retainer ring 9' threaded in the outer wall 11.

As a further modification, not illustrated, the member 12' can be formed only with the encircling portions 12" in the interpole regions, open at each end and thereby providing open windows receiving the magnet portions 6'. However, when member 12' or the like extends across the face of the magnet flux producing portions 6' it also functions as a damping means.

Figure 9:
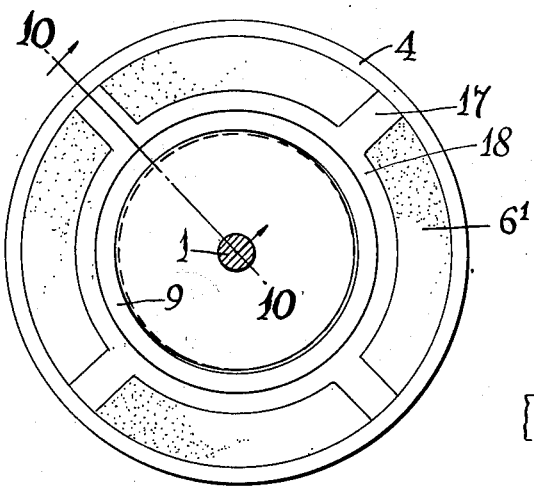
FIG. 9 is an end elevational view of another embodiment of my invention, providing temperature compensating means.
Figure 10:
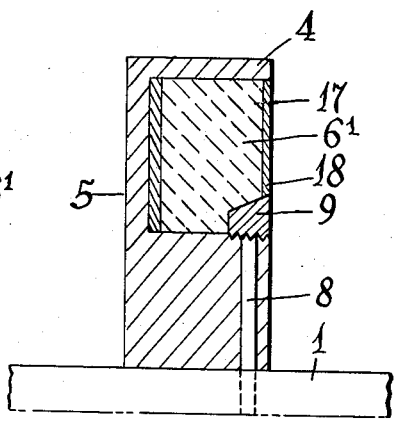
FIG. 10 is an enlarged longitudinal, quarter sectional view thereof, taken about on line 10—10 of FIG. 9.

FIGS. 9 and 10 disclose a temperature compensating arrangement, wherein the magnet body 6 is slightly axially recessed between flux producing portions 6', to receive radial fingers 17 of temperature compensating material in the interpole regions, which material has the desirable properties of a low Curie point, is relatively strong, not too permeable, and is highly electrically resistive, such as a nickel-steel alloy. The hub 18 of the compensating material is held by retainer 9, which also holds the magnet body 6 against axial shifting.

If desired, a film of suitable temperature compensating material, for example, of 0.03–0.04 inch thickness can extend across the front, air gap surface of body 6 in the manner of front wall 12 in FIG. 6, but the most efficient part is in the interpole area. Where the magnet poles 6' are encircled by the electrically conductive portions 12", the temperature compensating material can be applied over the portions 12", and normally will extend over a part of the poles 6' although in some cases it will be narrower than the interpole region.

Further, to strengthen the relatively brittle magnet body, I contemplate the process comprising first subjecting the body to vacuum, to evacuate air therefrom, and then impregnating the body with an appropriate resin, such as epoxy resin. The resin impregnated magnetic body is then cured, preferably by catalyzed polymerization rather than by the evaporation of solvent, to avoid shrinkage and voids.

Where it is desired to avoid forming the magnet body and its casing so that they precisely interfit, the magnet can have a loose fit in the casing and the waste space can be filled in with a suitable cement.

Accordingly, it is seen that my invention fully accomplishes its intended objects. While I have disclosed and described in detail certain embodiments of my invention, that has been done by way of illustration only and without thought of limitation, it being my intention that the scope of my invention be defined by the appended claims.

Having fully disclosed my invention, and described its mode of operation, what I claim as new is:

1. In a dynamoelectric machine of the axial air gap type, a rotary field producing structure comprising, a shaft journaled for rotation about the axis thereof, an annular body of ceramic permanent magnet material generally concentric with said axis, an annular casing of unitary construction receiving and supporting said magnet body, said casing comprising an outer annular side wall generally concentric with said axis encircling the outer peripheral side of said magnet body for supporting the latter against centrifugal force and an annular end wall extending across one end face of said magnet body from said outer side wall, and means fixing said casing to said shaft for rotation therewith, wherein said casing is formed of a relatively light weight and non-magnetic material, together with an annular flux return member of magnetic material interposed between said casing end wall and said one end face of said body.

2. In a dynamoelectric machine of the axial air gap type, a rotary field producing structure comprising, a shaft journaled for rotation about the axis thereof, an annular body of ceramic permanent magnet material generally concentric with said axis, an annular casing of unitary construction receiving and supporting said magnet body, said casing comprising an outer annular side wall generally concentric with said axis encircling the outer peripheral side of said magnet body for supporting the latter against centrifugal force and an annular end wall extending inwardly along one end face of said magnet body from said outer side wall, said casing being formed of a relatively light weight and non-magnetic material, and an annular flux return member of magnetic material interposed between said casing end wall and said one end face of said body, said casing, body and member being mounted on said shaft for rotation therewith.

3. A field producing structure as set forth in claim 2, wherein said casing is formed of a relatively light weight and nonmagnetic material, said casing outer side wall tapering outwardly from said casing end wall and comprising the sole support for said magnet body against centrifugal force.

4. In a dynamoelectric machine of the axial air gap type, a rotary field producing structure comprising, a shaft journaled for rotation about the axis thereof, an annular body of ceramic permanent magnet material generally concentric with said axis, an annular casing of unitary construction receiving and supporting said magnet body, said casing comprising an outer annular side wall generally concentric with said axis encircling the outer peripheral side of said magnet body for supporting the latter against centrifugal force and an annular end wall extending along one end face of said magnet body from said outer side wall, said casing being mounted on said shaft for rotation therewith, and a retainer ring secured to said casing and overlying a portion of said magnet body, wherein said casing is formed of a relatively lightweight non-magnetic material, together with a flux return member interposed between said casing end wall and the end face of said magnet body adjacent thereto.

5. A dynamoelectric machine as set forth in claim 4, wherein said casing has an inner wall concentric with said outer wall, said retainer ring being secured to said casing inner wall.

6. A dynamoelectric machine as set forth in claim 5, together with pin means extending through said inner casing wall and said shaft and fixing said casing on said shaft, said pin means being covered by said retainer ring.

References Cited in the file of this patent

UNITED STATES PATENTS

| | | |
|---|---|---|
| 2,104,707 | Rawlings | Jan. 4, 1938 |
| 2,488,729 | Kooyman | Nov. 22, 1949 |
| 2,698,396 | Stokmans | Dec. 28, 1954 |
| 2,782,721 | White | Feb. 26, 1957 |
| 2,861,205 | Kober | Nov. 18, 1958 |

FOREIGN PATENTS

| | | |
|---|---|---|
| 670,228 | Great Britain | Apr. 16, 1952 |
| 747,727 | Great Britain | Apr. 11, 1956 |